US010761726B2

(12) United States Patent
Xu et al.

(10) Patent No.: US 10,761,726 B2
(45) Date of Patent: Sep. 1, 2020

(54) RESOURCE FAIRNESS CONTROL IN DISTRIBUTED STORAGE SYSTEMS USING CONGESTION DATA

(71) Applicant: VMWare, Inc., Palo Alto, CA (US)

(72) Inventors: Yiqi Xu, Redwood City, CA (US); Eric Knauft, San Francisco, CA (US); Enning Xiang, San Jose, CA (US); Xiaochuan Shen, Fremont, CA (US)

(73) Assignee: VWware, Inc., Palo Alto, CA (US)

( * ) Notice: Subject to any disclaimer, the term of this patent is extended or adjusted under 35 U.S.C. 154(b) by 112 days.

(21) Appl. No.: 15/954,512

(22) Filed: Apr. 16, 2018

(65) Prior Publication Data

US 2019/0317665 A1    Oct. 17, 2019

(51) Int. Cl.
   *G06F 3/06*     (2006.01)
   *H04L 12/801*   (2013.01)
   *H04L 12/825*   (2013.01)

(52) U.S. Cl.
   CPC .......... *G06F 3/0604* (2013.01); *G06F 3/067* (2013.01); *G06F 3/0646* (2013.01); *H04L 47/10* (2013.01); *H04L 47/25* (2013.01)

(58) Field of Classification Search
   None
   See application file for complete search history.

(56) References Cited

U.S. PATENT DOCUMENTS

| | | | | |
|---|---|---|---|---|
| 7,739,470 B1* | 6/2010 | Norgren | ............... | G06F 11/3485 709/224 |
| 9,798,474 B2* | 10/2017 | Barzik | ................... | G06F 3/067 |
| 2008/0034370 A1* | 2/2008 | Huizenga | .............. | G06F 9/5011 718/104 |
| 2015/0058475 A1* | 2/2015 | Earl | ....................... | H04L 47/24 709/224 |
| 2016/0062795 A1* | 3/2016 | Hu | ....................... | H04L 47/783 718/104 |
| 2016/0205179 A1* | 7/2016 | Cui | ........................ | G06F 9/5083 709/226 |
| 2016/0301610 A1* | 10/2016 | Amit | ................... | H04L 67/1097 |
| 2018/0136839 A1* | 5/2018 | Brue | ....................... | G06F 3/061 |
| 2019/0068521 A1* | 2/2019 | Kumar | ............... | H04L 63/0428 |

OTHER PUBLICATIONS

Aron Eng (How to minimize the Performance Impact of Re-Replication, pp. 3; Dec. 30, 2013 (Year: 2013).*
Duncan Epping (What's new for VMware vSAN 6.6? Date: Apr. 11, 2017, pp. 10) (Year: 2017).*
Cormac (What's new for VMware vSAN 6.6? Date: Apr. 11, 2017, pp. 15) (Year: 2017).*

\* cited by examiner

*Primary Examiner* — Kaushikkumar M Patel
(74) *Attorney, Agent, or Firm* — Loza & Loza, LLP (57) ABSTRACT

Computer system and method for managing storage requests in a distributed storage system uses congestion data related to processing of storage requests for local storage to adaptively adjust a bandwidth limit for a first class of storage requests to be processed. The bandwidth limit is enforced on the storage requests belonging to the first class of storage requests without enforcing any bandwidth limit on the storage requests belonging to a second class of storage requests.

14 Claims, 9 Drawing Sheets

FIG. 8

RESOURCE FAIRNESS CONTROL IN DISTRIBUTED STORAGE SYSTEMS USING CONGESTION DATA

BACKGROUND

A distributed storage system allows a cluster of host computers to aggregate local storage devices, which may be located in or attached to each host computer, to create a single and shared pool of storage. This pool of storage is accessible by all host computers in the cluster, including any virtualized instances running on the host computers, such as virtual machines. Because the shared local storage devices that make up the pool of storage may have different performance characteristics, such as capacity, input/output per second (IOPS) capabilities, etc.), usage of such shared local storage devices to store data may be distributed among the virtual machines based on the needs of each given virtual machine.

This approach provides enterprises with cost-effective performance. For instance, distributed storage using pooled local storage devices is inexpensive, highly scalable, and relatively simple to manage. Because such distributed storage can use commodity storage devices, e.g., disk drives, in the cluster, enterprises do not need to invest in additional storage infrastructure. However, one issue that arises with this approach relates to contention between multiple clients, such as virtual machines on different host computers, accessing the shared storage resources. In particular, reduced overall performance and higher latency occur when multiple clients and/or other software processes need to simultaneously access the same local storage devices.

BRIEF DESCRIPTION OF THE DRAWINGS

Throughout the description, similar reference numbers may be used to identify similar elements.

DETAILED DESCRIPTION

Figure 1:
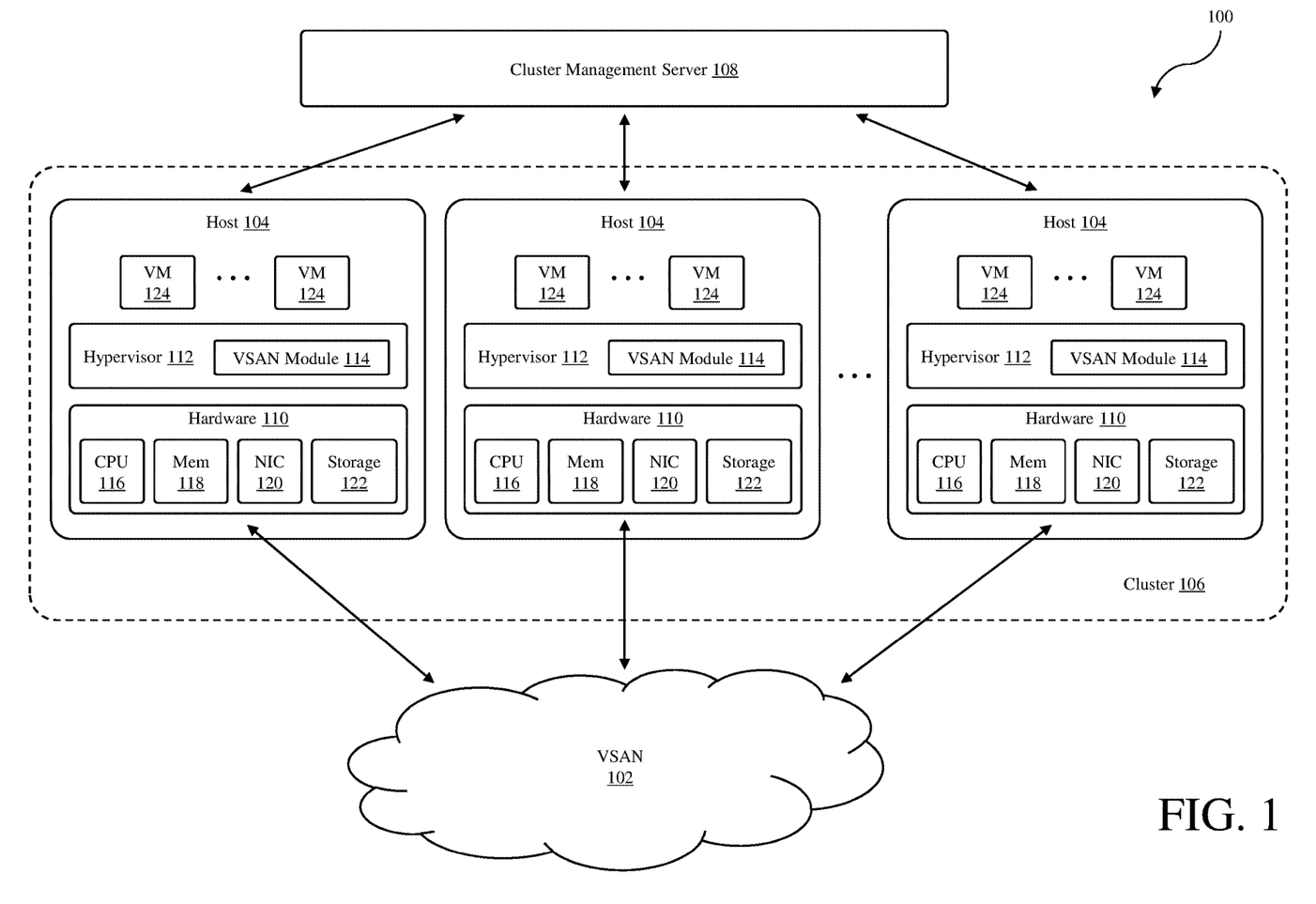
FIG. 1 is a block diagram of a distributed storage system in accordance with an embodiment of the invention.

FIG. 1 illustrates a distributed storage system 100 in accordance with an embodiment of the invention. As shown in FIG. 1, the distributed storage system 100 provides a software-based "virtual storage area network" (VSAN) 102 that leverages local storage resources of host computers 104, which are part of a logically defined cluster 106 of host computers that is managed by a cluster management server 108. The VSAN 102 allows local storage resources of the host computers 104 to be aggregated to form a shared pool of storage resources, which allows the host computers 104, including any software entities running on the host computers, to use the shared storage resources.

The cluster management server 108 operates to manage and monitor the cluster 106 of host computers. The cluster management server may be configured to allow an administrator to create the cluster 106, add host computers to the cluster and delete host computers from the cluster. The cluster management server may also be configured to allow an administrator to change settings or parameters of the host computers in the cluster regarding the VSAN 102, which is formed using the local storage resources of the host computers in the cluster. The cluster management server may further be configured to monitor the current configurations of the host computers and any virtual instances running on the host computers, for example, virtual machines (VMs). The monitored configurations may include hardware configuration of each of the host computers and software configurations of each of the host computers. The monitored configurations may also include virtual instance hosting information, i.e., which virtual instances (e.g., VMs) are hosted or running on which host computers. The monitored configurations may also include information regarding the virtual instances running on the different host computers in the cluster.

The cluster management server 108 may also perform operations to manage the virtual instances and the host computers 104 in the cluster 106. As an example, the cluster management server may be configured to perform various resource management operations for the cluster, including virtual instance placement operations for either initial placement of virtual instances and/or load balancing. The process for initial placement of virtual instances, such as VMs, may involve selecting suitable host computers for placement of the virtual instances based on, for example, memory and CPU requirements of the virtual instances, the current memory and CPU load on all the host computers in the cluster and the memory and CPU capacity of all the host computers in the cluster.

In some embodiments, the cluster management server 108 may be a physical computer. In other embodiments, the cluster management server may be implemented as one or more software programs running on one or more physical computers, such as the host computers 104 in the cluster 106, or running on one or more virtual machines, which may be hosted on any host computers. In an implementation, the cluster management server is a VMware vCenter™ server with at least some of the features available for such a server.

As illustrated in FIG. 1, each host computer 104 in the cluster 106 includes hardware 110, a hypervisor 112, and a VSAN module 114. The hardware 110 of each host computer includes hardware components commonly found in a physical computer system, such as one or more processors 116, one or more system memories 118, one or more network interfaces 120 and one or more local storage devices 122 (collectively referred to herein as "local storage"). Each processor 116 can be any type of a processor, such as a central processing unit (CPU) commonly found in a server. In some embodiments, each processor may be a multi-core processor, and thus, includes multiple independent processing units or cores. Each system memory 118, which may be random access memory (RAM), is the volatile memory of the host computer 104. The network interface 120 is an interface that allows the host computer to communicate with a network, such as the Internet. As an example, the network interface may be a network adapter. Each local storage device 122 is a nonvolatile storage, which may be, for example, a solid-state drive (SSD) or a magnetic disk.

The hypervisor 112 of each host computer 104, which is a software interface layer that, using virtualization technology, enables sharing of the hardware resources of the host computer by virtual instances 124, such as VMs, running on the host computer. With the support of the hypervisor, the VMs provide isolated execution spaces for guest software.

The VSAN module 114 of each host computer 104 provides access to the local storage resources of that host computer (e.g., handle storage input/output (I/O) operations to data objects stored in the local storage resources as part of the VSAN 102) by other host computers 104 in the cluster 106 or any software entities, such as VMs 124, running on the host computers in the cluster. As an example, the VSAN module of each host computer allows any VM running on any of the host computers in the cluster to access data stored in the local storage resources of that host computer, which may include virtual disks (or portions thereof) of VMs running on any of the host computers and other related files of those VMs. In addition to these VM I/Os, the VSAN module may handle other types of storage I/Os, such as namespace I/Os, resync I/Os, and internal metadata I/O. Namespace I/Os are writes and read operations for configuration files for VMs, such as vmx files, log files, digest files and memory snapshots. Resync I/Os are writes and read operations for data related to failed disks, host computers, racks or clusters. Internal metadata I/Os are writes and read operations for metadata of the VSAN, which may include operations that are performed on internal data structures other than actual data. The VSAN module is designed to provide fairness among these different classes of storage I/O requests, which may have different I/O patterns due to their different workloads.

In some virtual storage array networks, the two most contended types of storage I/O requests may be VM write requests and resync write requests. VM write requests are guest OS workload write I/O requests that persist data from the user, while resync write requests are background defensive I/O requests that are amplified by actions to restore failure to tolerate (FTT) during temporary times where FTT is less than the desired value (such as FTT=0 under RAID5 or FTT=0/1 under RAID6). Both VM and resync write requests contend for shared or individual resources on the lower tier level, such as the cache layer SSD/NVMe device. The quality of service (QoS) of these two types of storage I/O requests presents a dilemma to the lower level for both full utilization of the storage and isolation of service level agreements (SLAs) since resync write requests are transparent to the customers, and usually performed in parallel due to host level events. However, latency of guest VM write requests are more readily visible from a user's perspective. For example, an engineering rule of thumb is, if I/O latency rises to above 100 milliseconds (ms), the user will think the VM is not usable because the response time is deemed too long and hanging behavior is seen on the user interface. These conflicting targets using the same set of overall resources in a host/disk group level calls for a remedy when resync write requests flood the tier-1 resources and all storage I/O requests suffer from long delays.

One approach in order to resolve this issue is to use a congestion-based flow control mechanism to propagate resource constraint notification from the lowest data persistent layer to upper data path layers, which is used especially when the data persistent layer is close to or reaches its maximum resource constraint. This congestion mechanism works well for pushing back the storage I/O requests when resource fullness is above a certain threshold. This gives delays seen by the distributed object manager (DOM) client as well as the guest application, in the hope that the more resources will become available as de-staging is triggered. In a conventional implementation, a preference is given to VM write requests by manipulating the slope of the delay increases with the increase of overall write buffer fullness on the tier-1 device. However, this method does not solve the problem of unfairness by increased resync concurrency. This method produces the difference in the curve shape for VM and resync I/O requests respectively, but the change is static and tunable on a very coarse granularity, and is not dynamically adjusting to the scenario online. The curve shape is based on a pragmatic approach with huge amounts of cost from human knowledge collection, experiments and heuristics.

Another approach is to temporarily let a user manually choose a fixed bandwidth limit per host computer, but the limit applies to all disk groups in the cluster, causing starvation for some disk groups without much VM writes, and less enforcement for others with much more VM writes.

The VSAN module 114 of each host computer 104 in the distributed storage system 100 in accordance with embodiments of the invention addresses the I/O fairness issue when the congestion or delay is caused by the per-component resource constraint, as explained below.

Figure 2:
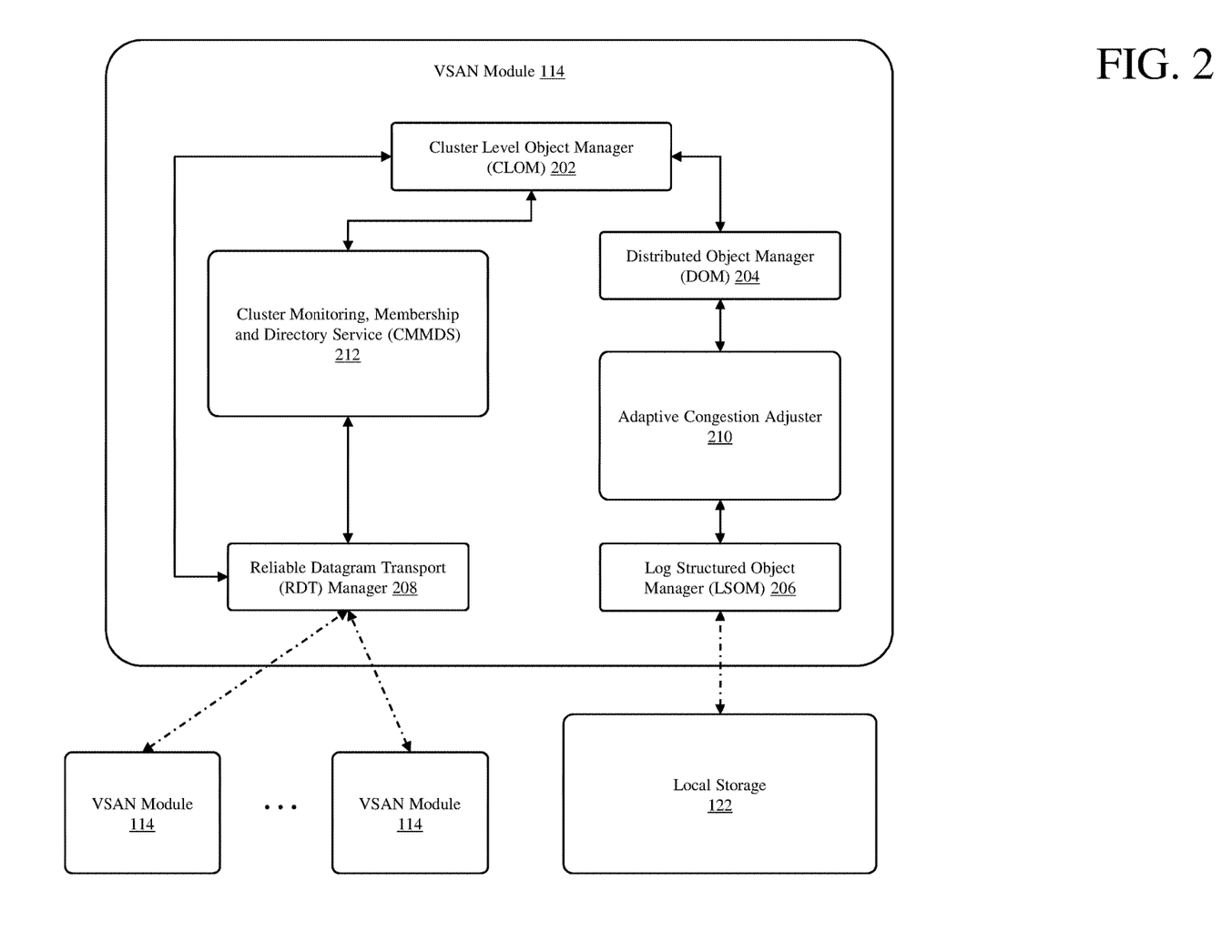
FIG. 2 is a block diagram of a virtual storage array network (VSAN) module in each host computer of the distributed storage system in accordance with an embodiment of the invention.

Turning now to FIG. 2, components of the VSAN module 114, which is included in each host computer 104 in the cluster 106, in accordance with an embodiment of the invention are shown. As shown in FIG. 2, the VSAN module includes a cluster level object manager (CLOM) 202, a distributed object manager (DOM) 204, a local log structured object management (LSOM) 206, a reliable datagram transport (RDT) manager 208, an adaptive congestion adjuster 210 and a cluster monitoring, membership and directory service (CMMDS) 212. These components of the VSAN module may be implemented as software running on each of the host computers in the cluster.

The CLOM 202 operates to validate storage resource availability, and DOM 204 operates to create components and apply configuration locally through the LSOM 206. The DOM also operates to coordinate with counterparts for component creation on other host computers 104 in the cluster 106. All subsequent reads and writes to storage objects funnel through the DOM 204, which will take them to the appropriate components. The LSOM operates to monitor the flow of storage I/O operations to the local storage 122, for example, to report whether a storage resource is congested. In an embodiment, the LSOM generates a congestion signal that indicates current storage usage, such as the current tier-1 device fullness, which indicates the current congestion at the local storage 122. The RDT manager 208 is the communication mechanism for storage I/Os in a VSAN network, and thus, can communicate with the VSAN modules in other host computers in the cluster. The RDT manager uses transmission control protocol (TCP) at the transport layer and it is responsible for creating and destroying TCP connections (sockets) on demand. The adaptive congestion adjuster 210 operates to adaptively adjust or modify a bandwidth limit for at least one of the different classes of storage I/O requests to ensure fairness between the different classes of storage I/O requests, e.g., between resync storage I/O requests and non-resync storage I/O requests, with respect to management of the storage I/O requests, as described in detail below. The CMMDS 212 is responsible for monitoring the VSAN cluster's membership, checking heartbeats between the host computers in the cluster, and publishing updates to the cluster directory. Other software components use the cluster directory to learn of changes in cluster topology and object configuration. For example, the DOM uses the contents of the cluster directory to determine the host computers in the cluster storing the components of a storage object and the paths by which those host computers are reachable.

Figure 3:
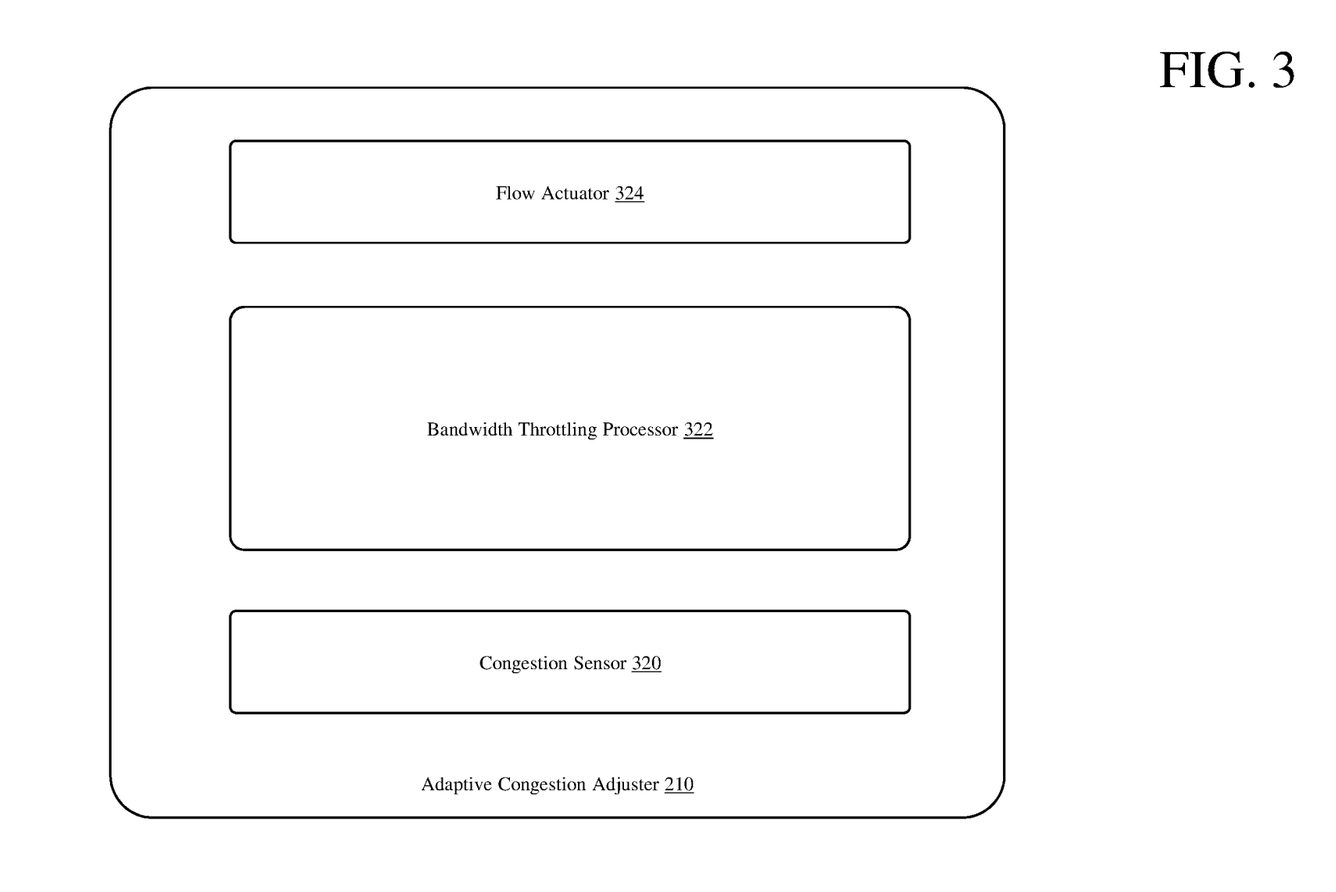
FIG. 3 is a block diagram of an adaptive congestion adjuster of the VSAN module shown in FIG. 2 in accordance with an embodiment of the invention.

As noted above, the adaptive congestion adjuster 210 of the VSAN module 114 manages different classes of storage I/O requests being handled by that VSAN module so that the storage I/O requests processed in a fair manner. FIG. 3, depicts components of the adaptive congestion adjuster 210 in accordance with an embodiment of the invention. As shown in FIG. 3, the adaptive congestion adjuster 210 includes a congestion sensor 320, a bandwidth throttling processor 322 and a flow actuator 324. As explained below, these components of the adaptive congestion adjuster 210 operate to control the congestion of at least one class of storage I/O requests, e.g., VM I/O requests, by adaptively adjusting the bandwidth limit on another class of storage I/O requests, e.g., resync I/O requests, based on current congestion data related to processing of storage I/O requests for the local storage 122.

The congestion sensor 320 operates to collect storage congestion data for a particular class of storage I/O requests, e.g., resync I/O storage requests. In an embodiment, the congestion sensor 320 collects storage device latency data, congestion level data and fairness index data. Storage device latency metric indicates how busy the underlying local storage device is processing storage I/O requests. Congestion level metric indicates the fullness of the resources above the local storage 122, but below the DOM 204, which in most cases correspond to write buffer fullness. In an embodiment, the congestion level metric is a numerical value, e.g., between 0 and 255, where 0 represents no congestion and 255 represents maximum congestion. Fairness index metric is a higher-level indicator of the achieved bandwidth ratio, how fair/unfair is the current allocated bandwidth for two or more competing types of storage I/O requests. It is noted here that M1+f(M2), where M1 is storage device latency, M2 is metric congestion level metric and f is a function mapping congestion level metric (e.g., [0:255]) to a delay in store I/O request execution (e.g., [0:8000]) in milliseconds (ms), will be a visible delay that can be seen by the guest application for each storage I/O request. In an embodiment, the congestion sensor 320 resides in a component manager I/O completion processing function, extracting congestion, doing high-precision rolling average and saving the cumulative data in the storage inside a scheduler of a DOM server data structure.

The bandwidth throttling processor 322 operates to process the congestion data collected by the congestion sensor 320 to adaptively adjust the bandwidth limit of at least one of the classes of the storage I/O requests so that fairness control of different classes of storage I/O requests can be achieved. Thus, the bandwidth throttling processor 322 will lower or raise the bandwidth limit of at least one of the classes of the storage I/O requests in response to collected congestion data in a closed feedback control loop. In some embodiments, the bandwidth throttling processor 322 uses aggressive decrease or backing off to lower the bandwidth limit of at least one of the classes of the storage I/O requests and then gradual increase to raise the bandwidth limit to control one or more classes of storage I/O requests. In a particular implementation, the bandwidth throttling processor 322 lowers the bandwidth limit of at least one of the classes of the storage I/O requests by a predefined percentage, e.g., 50%, at each control interval, which may be set to a default setting of 30 seconds but is configurable by the user, and raises the bandwidth limit of at least one of the classes of the storage I/O requests at a predefined bandwidth step, which may be set to a default setting of 25 Megabytes per second (MBps) or a user-defined value. In some implementations, the bandwidth throttling processor 322 outputs the bandwidth limit of at least one of the classes of the storage I/O requests as a control parameter to be used by the flow actuator 324.

The adjustments to the bandwidth limit of at least one of the classes of the storage I/O requests may be based on one or more of the collected congestion metrics. Thus, in some embodiments, the bandwidth throttling processor 322 may use one of the storage device latency data, the congestion level data and the fairness index data to reduce or increase the bandwidth limit of at least one of the classes of the storage I/O requests. In other embodiments, the bandwidth throttling processor 322 may use any combination of the storage device latency data, the congestion level data and the fairness index data to adjust the bandwidth limit of at least one of the classes of the storage I/O requests.

The flow actuator 324 operates to apply the bandwidth limit of at least one of the classes of the storage I/O requests, which is the control parameter output of the bandwidth throttling processor 322. Using the bandwidth limit of at least one of the classes of the storage I/O requests, the flow actuator 324 enforces how many storage I/O requests belonging to the class of storage I/O requests with the bandwidth limit are dispatched to the lower level, e.g., the LSOM 206. However, storage I/O requests belonging to other classes of storage I/O requests without any bandwidth limits are dispatched to the lower level without any control from the flow actuator 324.

In an embodiment, the flow actuator 324 uses a concept of virtual timeline to carve each storage I/O request's time usage based on the formula 1/{input/output operations per second (IOPS) limit}, where {IOPS limit} is the bandwidth limit for a particular class of storage I/O requests. The virtual time can catch up to real time whenever possible. Thus, lagging storage I/O requests cannot save credits for future use. Such "use it or lose it" policy ensures work-conservingness and fairness.

Figure 4:
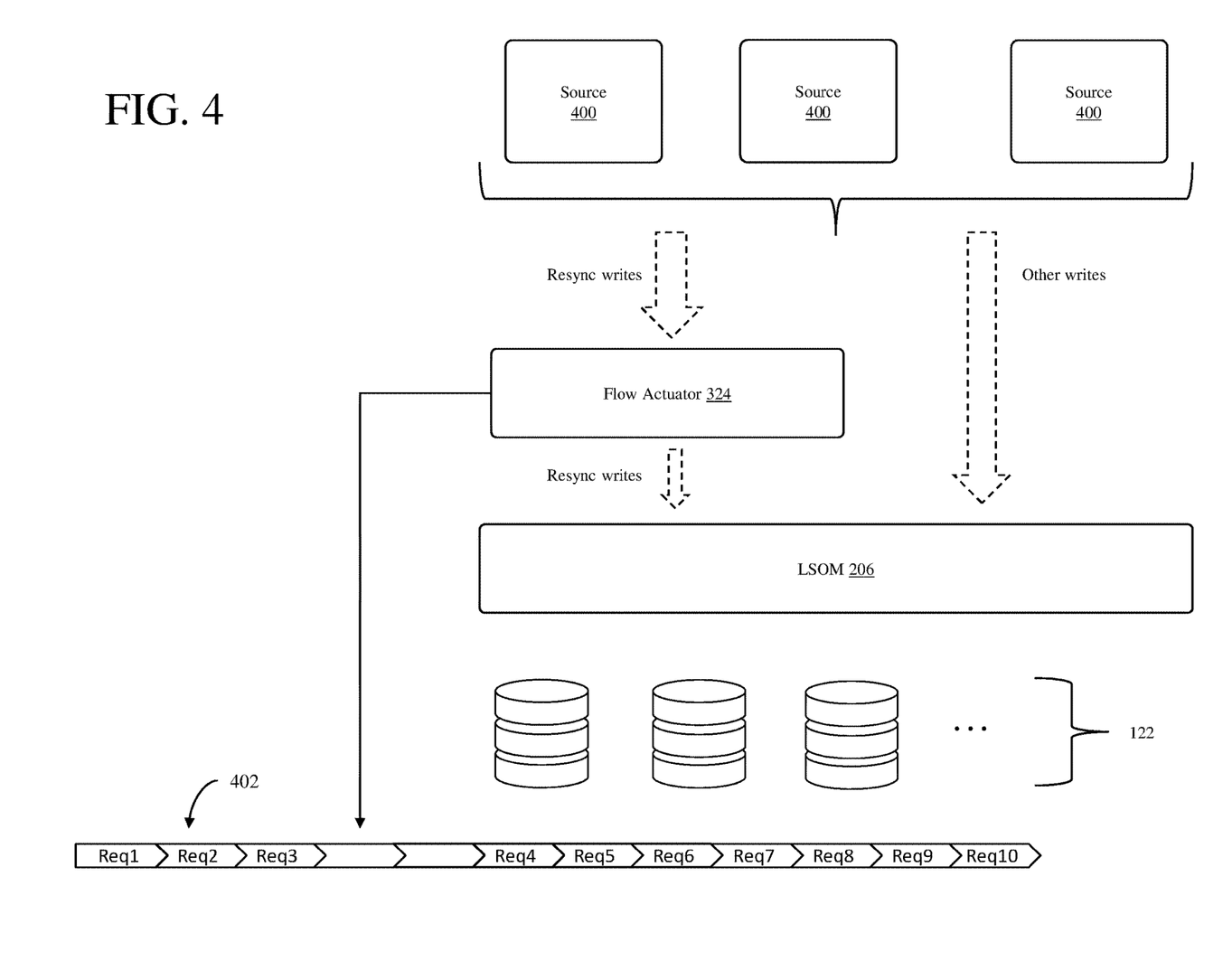
FIG. 4 illustrates a virtual timeline concept used by a flow actuator of the adaptive congestion adjuster shown in FIG. 3 in accordance with an embodiment of the invention.

The virtual timeline concept is illustrated in FIG. 4, which shows resync write requests from sources 400 of storage I/O requests to the LSOM 206 being limited by the flow actuator 324, while other classes of write requests, such as VM write requests, are being dispatched to the LSOM 206 without any limit or control. The sources 400 of storage I/O requests may include the host computers 104 of the cluster 106, the VMs 124 running on the host computers 104 and software processes or routines (not shown) operating in the host computers 104. As illustrated in FIG. 4, the flow actuator 324 uses a virtual time 402, which includes 10 (ten) resync write requests distributed throughout a predefined time interval to limit the number of resync write requests being processed, e.g., dispatched to the LSOM 206. For each local storage device, e.g., a disk, the virtual time defines how soon/late the next resync write request can be dispatched, enforcing its bandwidth usage. Because the resync write requests are using shared resource in the LSOM 206, it is expected that the throttling of one type of storage I/O requests will lessen the congestion caused by that type of storage I/O requests, which will leave more resources for other classes of storage I/O requests. Thus, these other types of storage I/O requests will be subject to lower congestion/delays. Without such throttling, the resync write requests will be subject to a delay, which can be mitigated by increased number of outstanding I/O requests (OIOs), causing bandwidth usage unfairness between the different classes of storage I/O requests.

Figure 5:
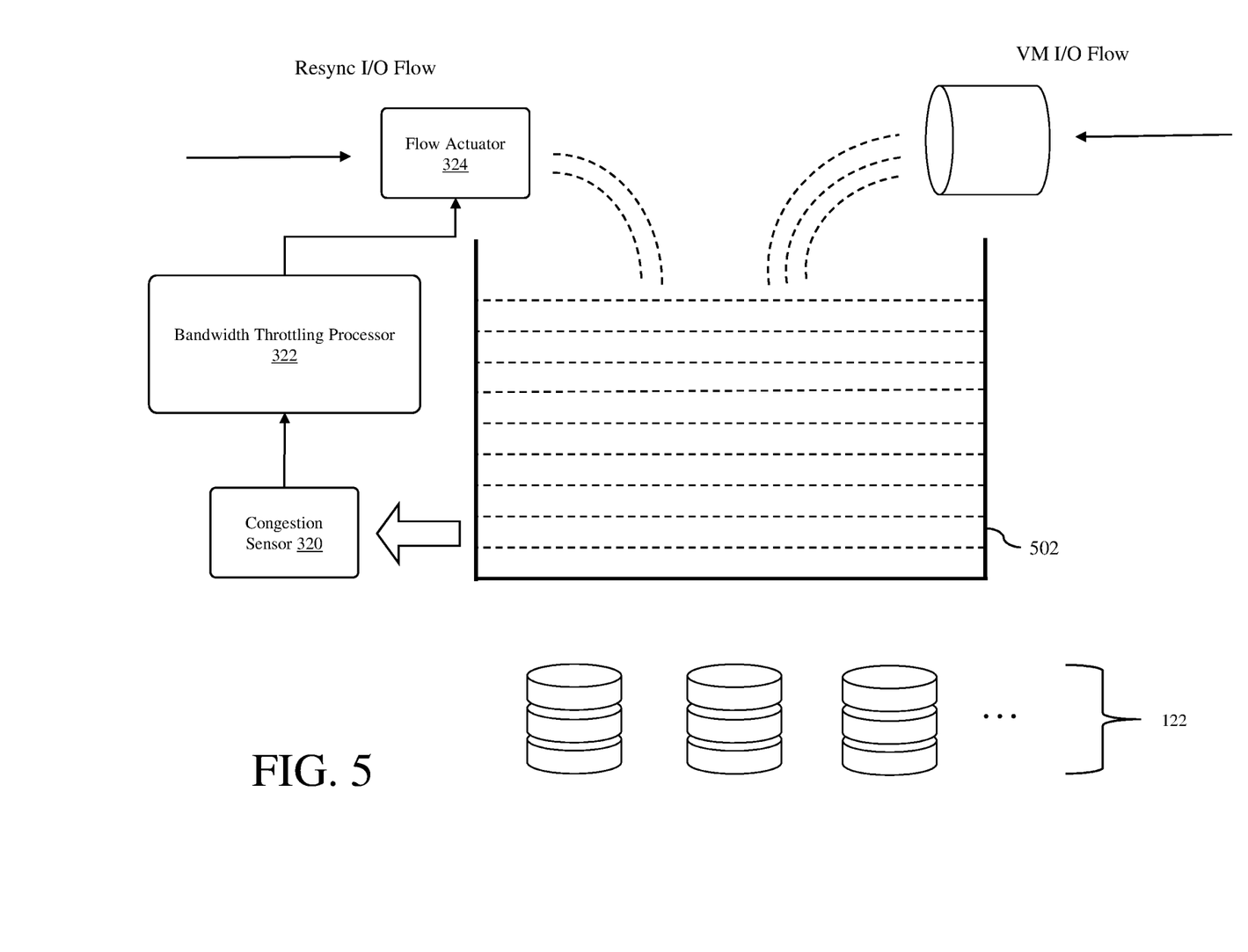
FIG. 5 illustrates the operation of the components of the adaptive congestion adjuster shown in FIG. 3 in accordance with an embodiment of the invention.

FIG. 5 illustrates the operation of the components of the adaptive congestion adjuster 210 in accordance with an embodiment of the invention. As illustrated in FIG. 5, congestion data regarding a write buffer 502 of the LSOM 206, which holds data to be written to the local storage 122 is collected by the congestion sensor 320. In particular, the VM write request congestion data is collected. The collected congestion data is used by the bandwidth throttling processor 322 to adaptively set the bandwidth limit of resync write requests. In some embodiments, the bandwidth limit of resync write requests is lowered exponentially when the VM write request congestion is above a high watermark or threshold and linearly increased when the VM write request congestion is below a low watermark or threshold. This bandwidth limit of resync write requests is then enforced by the flow actuator 324 to control the flow of resync write requests. However, since there is no bandwidth limit on other types or classes of write requests, such as VM write requests, these other types of write requests are not controlled or limited by the flow actuator 324, i.e., there is no enforcement of any bandwidth limits on these other types of write requests. The limit on the resync write requests will change the congestion data regarding the write buffer 502, which can then be used to further adjust the flow of resync write requests.

Figure 6:
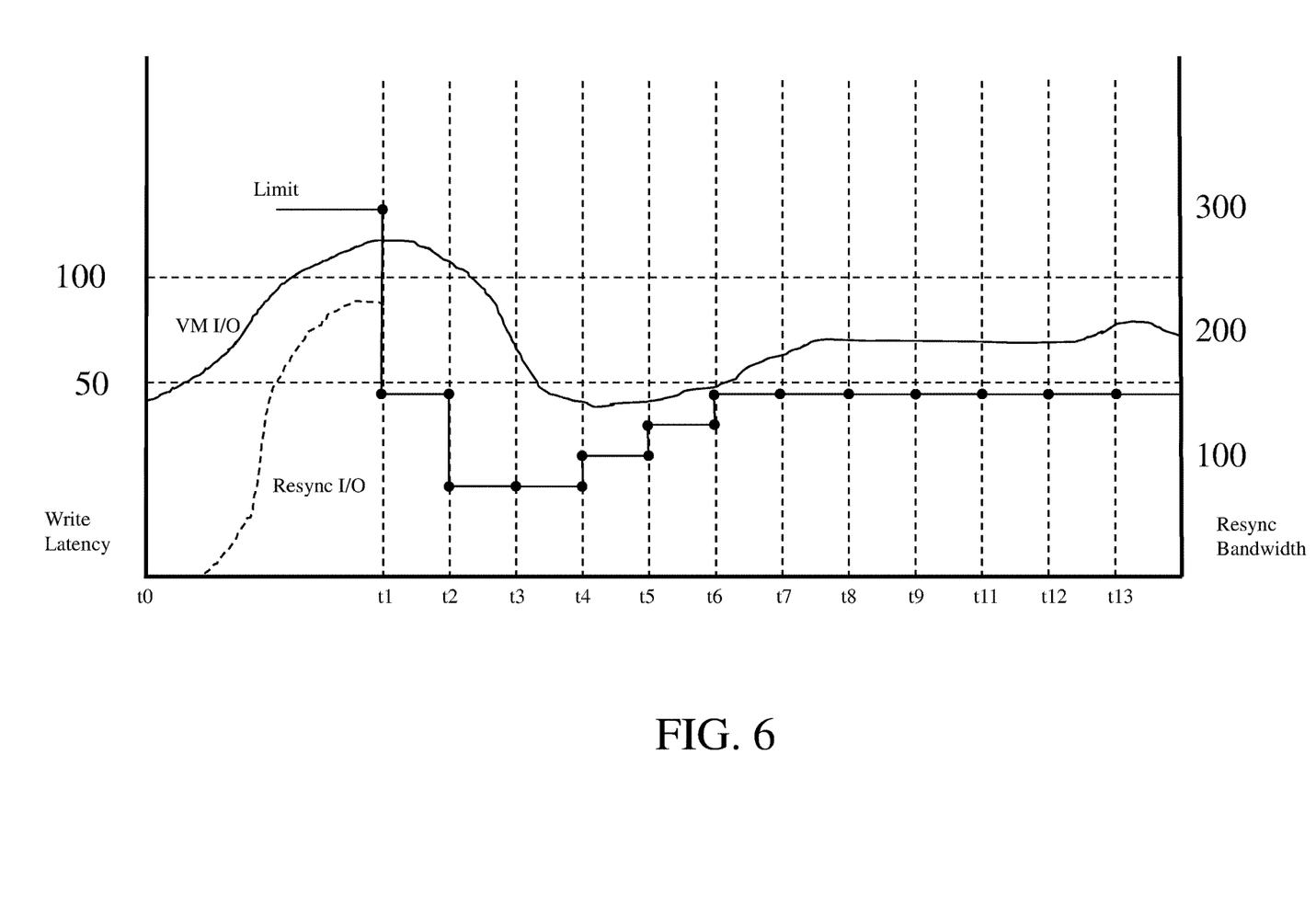
FIG. 6 is a graph illustrating adjustments to a bandwidth limit of resync input/output (I/O) requests in accordance with an embodiment of the invention.

Turning now to FIG. 6, a graph illustrating adjustments to a bandwidth limit of resync I/O requests in accordance with an embodiment of the invention is depicted. In this example, the adaptive congestion adjuster 210 uses write latencies of VM write requests and resync write requests with a high threshold of 100 ms and a low threshold of 50 ms to adaptively adjust the bandwidth of resync write requests. Between t=0 to t=t1, both VM and resync write requests start to drive resource fullness up, raising the write latencies of both types of requests. In particular, the write latency of VM write requests has exceeded the high threshold of 100 ms. Thus, at t=t1, the adaptive congestion adjuster 210 lowers the resync bandwidth limit from 300 IOPS, which may be a default setting but is configurable by the user, by 50% to 150 IOPS. At t=t2, since the write latency of VM write requests is still above the high threshold of 100 ms, the adaptive congestion adjuster 210 lowers the resync bandwidth limit again from 150 IOPS by 50% to 75 IOPS. At t=t3, since the write latency of VM write requests is between the high threshold of 100 ms and the low threshold of 50 ms, the adaptive congestion adjuster 210 takes no action, i.e., does not adjust the resync bandwidth limit and sets the resync bandwidth limit to be same as the previous resync bandwidth limit of t=t2. At t=t4, since the write latency of VM write requests is below the low threshold of 50 ms, the adaptive congestion adjuster 210 raises the resync bandwidth limit from 75 IOPS by 25 IOPS step to 100 IOPS. At t=t5, since the write latency of VM write requests is still below the low threshold of 50 ms, the adaptive congestion adjuster 210 again raises the resync bandwidth limit from 100 IOPS by 25 IOPS step to 125 IOPS. At t=t6, since the write latency of VM write requests is still below the low threshold of 50 ms, the adaptive congestion adjuster 210 again raises the resync bandwidth limit from 125 IOPS by 25 IOPS step to 150 IOPS. At t=t7 through t=t13, since the write latency of VM write requests is between the high threshold of 100 ms and the low threshold of 50 ms and has converged to equilibrium, the adaptive congestion adjuster 210 takes no action, i.e., does not adjust the resync bandwidth limit. Thus, the resync bandwidth remains at 150 IOPS and quality of service (QoS) for VM operations is maintained.

Figure 7A:
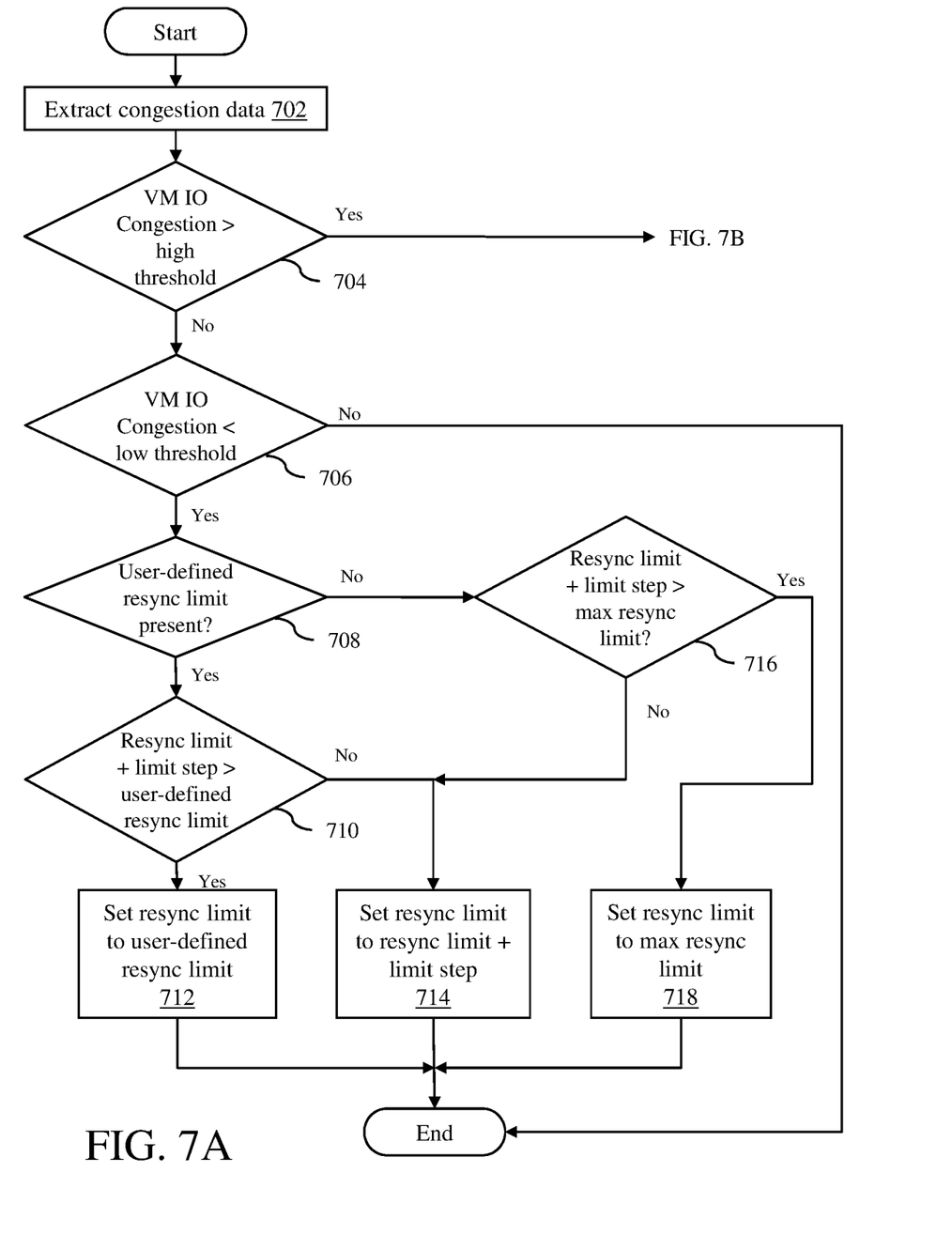
FIGS. 7A and 7B show a process flow diagram of a resync I/O bandwidth limit adjustment operation executed by a bandwidth throttling processor of the adaptive congestion adjuster shown in FIG. 3 in accordance with one implementation.
Figure 7B:
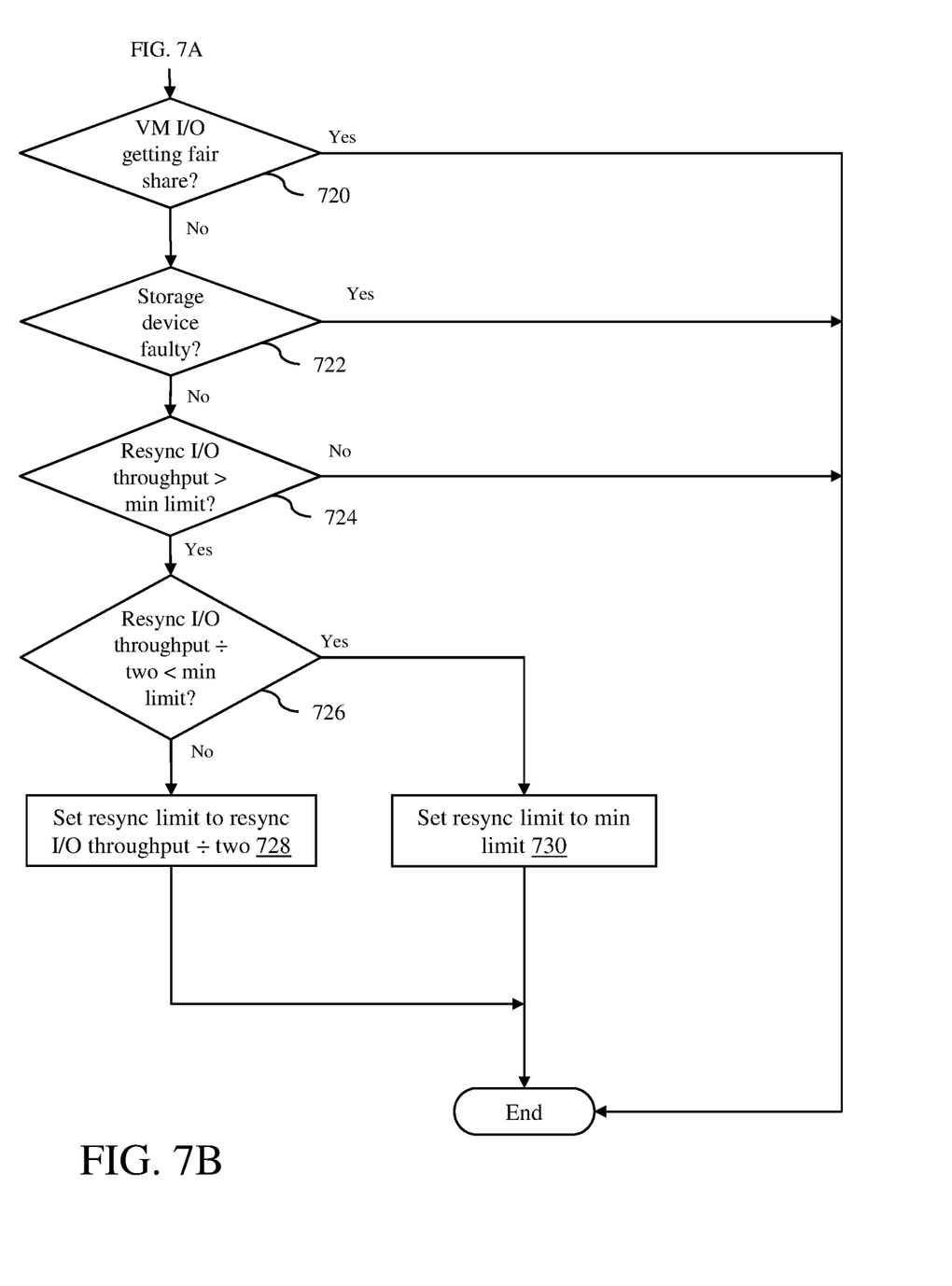

The resync I/O bandwidth limit adjustment operation performed by the bandwidth throttling processor 322 of the adaptive congestion adjuster 210 of the VSAN module 114 in each host computer 104 of the distributed storage system 100 in accordance with one implementation is now described with reference to a process flow diagram of FIGS. 7A and 7B. This operation may be initiated automatically at predefined time intervals, for example, every thirty (30) seconds or every user-defined time interval.

At block 702, congestion data collected by the congestion sensor 320 is extracted. The extracted congestion data includes at least VM I/O request congestion or latency and resync I/O request throughput. In an embodiment, the VM I/O request congestion includes VM write request latency and the resync I/O request throughput is the throughput of resync write requests. In an embodiment, the congestion data may be derived from per I/O completion data using rolling averages.

Next, at block 704, a determination is made whether the current VM I/O congestion is greater than a high threshold, which may be set at 100 ms or a user-defined value. If the current VM I/O congestion is greater than the high threshold, then the operation proceeds to block 720 (FIG. 7B). However, if the current VM I/O congestion is not greater than the high threshold, the operation proceeds to block 706, where a determination is made whether the current VM I/O congestion is less than a low threshold, which may be set at 50 ms or a user-defined value.

If the current VM I/O congestion is not less than the low threshold, then the operation comes to an end. However, if the current VM I/O congestion is not greater than the high threshold, the operation proceeds to block 708, where a determination is made whether a user-defined maximum resync I/O bandwidth limit is present. That is, a determination is made whether a user has set or defined a maximum resync I/O bandwidth limit.

If there is a user-defined resync I/O bandwidth limit, the operation proceeds to block 710, where a determination is made whether the current resync bandwidth limit plus a limit step, which may be set at 25 IOPS or a user-defined value, is greater than a maximum resync I/O bandwidth limit, which may be a predefined value or unlimited. If the current resync bandwidth limit plus the limit step is greater than the user-defined resync I/O bandwidth limit, then the operation proceeds to block 712, where the current resync I/O bandwidth limit is set to the user-defined resync I/O bandwidth limit. The operation then comes to an end. However, if the current resync bandwidth limit plus the limit step is not greater than the user-defined resync I/O bandwidth limit, then the operation proceeds to block 714, where the current resync I/O bandwidth limit is set to the current resync I/O bandwidth limit plus the limit step. The operation then comes to an end.

If it is determined that there is no user-defined resync I/O bandwidth limit at block 708, the operation proceeds to block 716, where a determination is made whether the current resync bandwidth limit plus the limit step is greater than a maximum resync I/O bandwidth limit, which may be a predefined value or unlimited. If the current resync bandwidth limit plus the limit step is greater than the maximum resync I/O bandwidth limit, then the operation proceeds to block 718, where the current resync I/O bandwidth limit is set to maximum resync I/O bandwidth limit. The operation then comes to an end. However, if the current resync bandwidth limit plus the limit step is not greater than the maximum resync I/O bandwidth limit, then the operation proceeds to block 714, where the current resync I/O bandwidth limit is set to the current resync I/O bandwidth limit plus the limit step. The operation then comes to an end.

At block 720 (FIG. 7B), a determination is made whether VM I/O requests are getting fair share of bandwidth of storage I/O requests being processed. In an embodiment, this fair share determination is made by looking at a ratio of VM I/O requests processed and resync I/O processed. For example, fair share of VM I/O requests to resync I/O requests may be determined to be 4 to 1 or [4:1]. In this example, if the ratio is less than [4:1], such as [3:1], then it can be determined that the VM I/O requests are getting an unfair share of the bandwidth.

If the VM I/O requests are getting fair share of the bandwidth, the operation comes to an end. However, if the VM I/O requests are not getting fair share of the bandwidth, the operation proceeds to block 722, where a determination is made whether a local storage device is faulty. Techniques for determining whether a local storage device, such as a hard disk, is faulty is well known, and thus, is not described herein in detail. If it is determined that the local storage device is faulty, the operation comes to an end with or without presenting an error message to the user. However, if it is determined that the local storage device is not faulty, the operation proceeds to block 724, where a determination is made whether the current resync I/O throughput is less than a minimum throughput limit, which may be set at 8 Mbps or a user-defined value.

If the current resync I/O throughput is not less than the minimum throughput limit, the operation comes to an end. However, if the current resync I/O throughput is less than the minimum throughput limit, the operation proceeds to block 726, where a determination is made whether the current resync I/O throughput divided by two (2) is less than the minimum throughput limit.

If the current resync I/O throughput divided by two is not less than the minimum throughput limit, the operation proceeds to block 728, where the current resync I/O bandwidth limit is set to the current resync I/O throughput divided by two. The operation then comes to an end. However, if the current resync I/O throughput divided by two is less than the minimum throughput limit, the operation proceeds to block 730, where the current resync I/O bandwidth limit is set to the minimum throughput limit. The operation then comes to an end.

Figure 8:
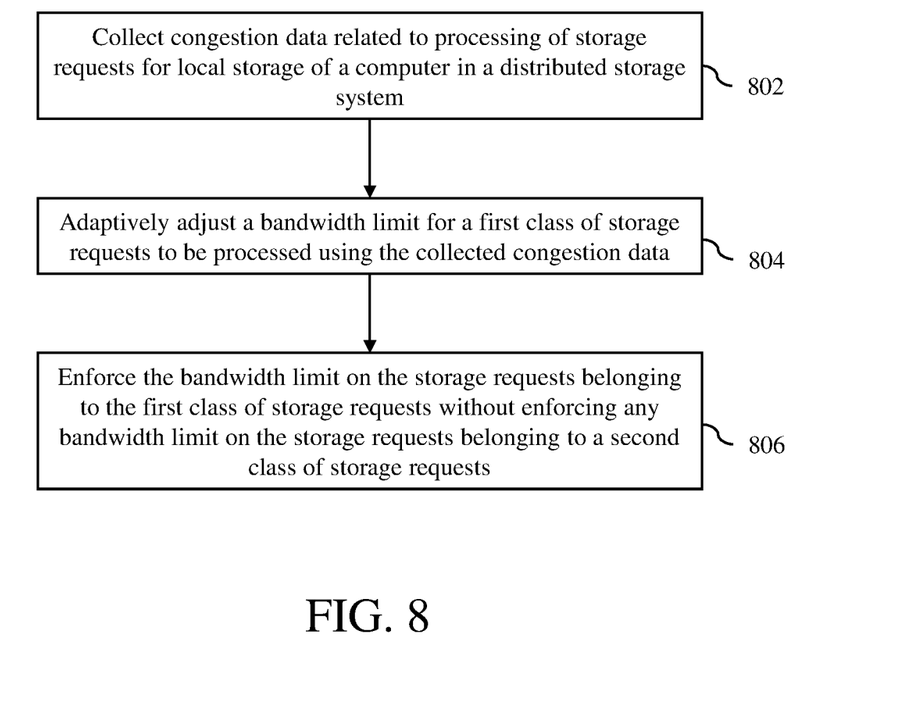
FIG. 8 is a flow diagram of a method of managing storage requests in a distributed storage system in accordance with an embodiment of the invention.

A method for managing storage I/O requests in a distributed storage system in accordance with an embodiment of the invention is described with reference to a flow diagram of FIG. 8. At block 802, congestion data related to processing of storage requests for local storage of a computer in the distributed storage system is collected. At block 804, a bandwidth limit for a first class of storage requests to be processed is adaptively adjusted using the collected congested congestion data. At block 806, the bandwidth limit on the storage requests belonging to the first class of storage requests is enforced without enforcing any bandwidth limit on the storage requests belonging to a second class of storage requests.

The components of the embodiments as generally described in this document and illustrated in the appended figures could be arranged and designed in a wide variety of different configurations. Thus, the following more detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated.

The present invention may be embodied in other specific forms without departing from its spirit or essential characteristics. The described embodiments are to be considered in all respects only as illustrative and not restrictive. The scope of the invention is, therefore, indicated by the appended claims rather than by this detailed description. All changes which come within the meaning and range of equivalency of the claims are to be embraced within their scope.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussions of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize, in light of the description herein, that the invention can be practiced without one or more of the specific features or advantages of a particular embodiment. In other instances, additional features and advantages may be recognized in certain embodiments that may not be present in all embodiments of the invention.

Reference throughout this specification to "one embodiment," "an embodiment," or similar language means that a particular feature, structure, or characteristic described in connection with the indicated embodiment is included in at least one embodiment of the present invention. Thus, the phrases "in one embodiment," "in an embodiment," and similar language throughout this specification may, but do not necessarily, all refer to the same embodiment.

Although the operations of the method(s) herein are shown and described in a particular order, the order of the operations of each method may be altered so that certain operations may be performed in an inverse order or so that certain operations may be performed, at least in part, concurrently with other operations. In another embodiment, instructions or sub-operations of distinct operations may be implemented in an intermittent and/or alternating manner.

It should also be noted that at least some of the operations for the methods may be implemented using software instructions stored on a computer useable storage medium for execution by a computer. As an example, an embodiment of a computer program product includes a computer useable storage medium to store a computer readable program that, when executed on a computer, causes the computer to perform operations, as described herein.

Furthermore, embodiments of at least portions of the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The computer-useable or computer-readable medium can be an electronic, magnetic, optical, electromagnetic, infrared, or semiconductor system (or apparatus or device), or a propagation medium. Examples of a computer-readable medium include a semiconductor or solid state memory, non-volatile memory, NVMe device, persistent memory, magnetic tape, a removable computer diskette, a random access memory (RAM), a read-only memory (ROM), a rigid magnetic disc, and an optical disc. Current examples of optical discs include a compact disc with read only memory (CD-ROM), a compact disc with read/write (CD-R/W), a digital video disc (DVD), and a Blu-ray disc.

In the above description, specific details of various embodiments are provided. However, some embodiments may be practiced with less than all of these specific details. In other instances, certain methods, procedures, components, structures, and/or functions are described in no more detail than to enable the various embodiments of the invention, for the sake of brevity and clarity.

Although specific embodiments of the invention have been described and illustrated, the invention is not to be limited to the specific forms or arrangements of parts so described and illustrated. The scope of the invention is to be defined by the claims appended hereto and their equivalents.

What is claimed is:

1. A method for managing storage requests in a distributed storage system, the method comprising:
    collecting congestion data related to processing of storage requests for local storage of a computer in the distributed storage system;
    adaptively adjusting a bandwidth limit for a first class of storage requests to be processed using the collected congestion data; and
    enforcing the bandwidth limit on the storage requests belonging to the first class of storage requests without enforcing any bandwidth limit on the storage requests belonging to a second class of storage requests,
    wherein adaptively adjusting the bandwidth limit for the first class of storage requests includes lowering the bandwidth limit for the first class of storage requests when congestion of the second class of storage requests for the local storage is greater than a first threshold and raising the bandwidth limit for the first class of storage requests when the congestion of the second class of storage requests for the local storage is less than a second threshold, the second threshold being lower than the first threshold.

2. The method of claim 1, wherein lowering the bandwidth limit for the first class of storage requests includes reducing the bandwidth limit for the first class of storage requests by a predefined percentage.

3. The method of claim 1, wherein raising the bandwidth limit for the first class of storage requests includes increasing the bandwidth limit for the first class of storage requests by a fixed bandwidth amount.

4. The method of claim 1, wherein adaptively adjusting the bandwidth limit for the first class of storage requests includes setting the bandwidth limit for the first class of storage requests to be same as a previous bandwidth limit for the first class of storage requests when the congestion of the second class of storage requests for the local storage is not greater than the first threshold and not less than the second threshold.

5. The method of claim 1, wherein the maximum value for the bandwidth limit for the first class of storage requests is user-defined.

6. The method of claim 1, wherein the first class of storage requests includes resync storage input/output requests and the second class of storage requests includes virtual machine storage input/output requests.

7. A non-transitory computer-readable storage medium containing program instructions for managing storage requests in a distributed storage system, wherein execution of the program instructions by one or more processors of a computer system causes the one or more processors to perform steps comprising:
    collecting congestion data related to processing of storage requests for local storage of a computer in the distributed storage system;
    adaptively adjusting a bandwidth limit for a first class of storage requests to be processed using the collected congestion data; and
    enforcing the bandwidth limit on the storage requests belonging to the first class of storage requests without enforcing any bandwidth limit on the storage requests belonging to a second class of storage requests,
    wherein adaptively adjusting the bandwidth limit for the first class of storage requests includes lowering the bandwidth limit for the first class of storage requests when congestion of the second class of storage requests for the local storage is greater than a first threshold and raising the bandwidth limit for the first class of storage requests when the congestion of the second class of storage requests for the local storage is less than a second threshold, the second threshold being lower than the first threshold.

8. The computer-readable storage medium of claim 7, wherein lowering the bandwidth limit for the first class of storage requests includes reducing the bandwidth limit for the first class of storage requests by a predefined percentage.

9. The computer-readable storage medium of claim 7, wherein raising the bandwidth limit for the first class of storage requests includes increasing the bandwidth limit for the first class of storage requests by a fixed bandwidth amount.

10. The computer-readable storage medium of claim 7, wherein adaptively adjusting the bandwidth limit for the first class of storage requests includes setting the bandwidth limit for the first class of storage requests to be same as a previous bandwidth limit for the first class of storage requests when the congestion of the second class of storage requests for the local storage is not greater than the first threshold and not less than the second threshold.

11. The computer-readable storage medium of claim 7, wherein the maximum value for the bandwidth limit for the first class of storage requests is user-defined.

12. The computer-readable storage medium of claim 7, wherein the first class of storage requests includes resync storage input/output requests and the second class of storage requests includes virtual machine storage input/output requests.

13. A computer system comprising:
    memory; and
    a processor configured to:

collect congestion data related to processing of storage requests for local storage of the computer system;

adaptively adjust a bandwidth limit for a first class of storage requests to be processed using the collected congestion data; and enforce the bandwidth limit on the storage requests belonging to the first class of storage requests without enforcing any bandwidth limit on the storage requests belonging to a second class of storage requests, wherein the processor is further configured to lower the bandwidth limit for the first class of storage requests when congestion of the second class of storage requests for the local storage is greater than a first threshold to adaptively adjust the bandwidth limit for the first class of storage requests and to raise the bandwidth limit for the first class of storage requests when the congestion of the second class of storage requests for the local storage is less than a second threshold, the second threshold being lower than the first threshold.

14. The computer system of claim 13, wherein the processor is further configured to set the bandwidth limit for the first class of storage requests to be same as a previous bandwidth limit for the first class of storage requests when the congestion of the second class of storage requests for the local storage is not greater than the first threshold and not less than the second threshold.

\* \* \* \* \*